H. Allen,
Governor.
Nº 5,718.        Patented Aug. 22, 1848
Fig: 1.
Fig: 2.
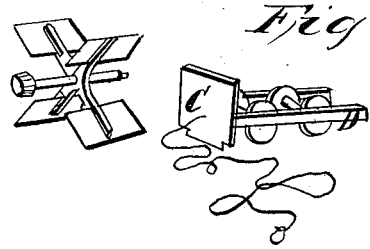
Fig: 3.
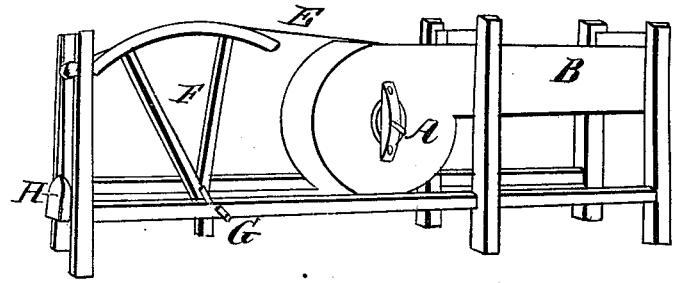

UNITED STATES PATENT OFFICE.

HENRY ALLEN. OF BRATTLEBORO, VERMONT.

GOVERNOR FOR REGULATING MOTION.

Specification of Letters Patent No. 5,718, dated August 22, 1848.

*To all whom it may concern:*

Be it known that I, HENRY ALLEN, of Brattleboro, in the county of Windham and State of Vermont, have invented a new and Improved Regulator for the Government and Equalization of the Motion of Machinery; and I do hereby declare that the following is a full and exact description thereof.

The nature of my invention consists in using a fan or wind wheel (see Figure I of the annexed drawings) which being geared or attached to any shaft (see A Fig. III) the motion of which is to be regulated shall produce in a conduit or passage (B Fig. III) a current of air. This current is increased when the motion is accelerated, and blows farther along in the passage or conduit against a screen (C Fig. II) attached to a carriage (D Fig. II) which runs freely on ways. To this screen is attached a cord (E Fig. III) which acts on the periphery of a wheel or segment (F, Fig III) to the axis of which (G Fig. III) the gate is attached which lets on or shuts off the steam or water. Another cord is also attached to the same periphery and passing over a pulley draws by means of a weight or counterpoise in an opposite direction (see H, Fig. III). So that an increased motion of the shaft shuts off the power, but when the motion flags the weight will prevail, the carriage recede, the orifice at the gate be more opened and power will be let on to the machinery.

What I claim as my invention and desire to secure by Letters Patent is—

A wind wheel or fan used in the manner and for the purpose above specified.

HENRY ALLEN.

Witnesses:
I. D. BRADLEY,
WM. C. BRADLEY.